United States Patent
Miyake et al.

(10) Patent No.: US 10,257,000 B2
(45) Date of Patent: Apr. 9, 2019

(54) SIGNAL PROCESSING DEVICE, CONTROL METHOD THEREOF, CONTROL PROCEDURE AND RECORDING MEDIUM

(71) Applicant: OMRON Corporation, Kyoto (JP)

(72) Inventors: Hiroki Miyake, Kyoto (JP); Toshiyuki Kojima, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/376,679

(22) Filed: Dec. 13, 2016

(65) Prior Publication Data

US 2017/0222839 A1    Aug. 3, 2017

(30) Foreign Application Priority Data

Jan. 29, 2016    (JP) ................................ 2016-016349

(51) Int. Cl.
| H04L 25/03 | (2006.01) |
| H04L 12/26 | (2006.01) |
| G01D 3/032 | (2006.01) |
| H04L 25/00 | (2006.01) |

(52) U.S. Cl.
CPC ....... H04L 25/03299 (2013.01); G01D 3/032 (2013.01); H04L 43/028 (2013.01)

(58) Field of Classification Search
CPC ........... H04L 25/03057; H04L 27/2334; H04L 25/03146; H04L 25/0328; H04L 43/028
USPC .......................... 375/284–285, 343, 346, 350
See application file for complete search history.

(56) References Cited

U.S. PATENT DOCUMENTS

| 4,751,973 | A | * | 6/1988 | Freeman | .............. | G01G 3/1414 |
| | | | | | | 177/185 |
| 5,172,783 | A | | 12/1992 | Feinland et al. | | |
| 5,308,930 | A | * | 5/1994 | Tokutu | ................. | G01G 11/046 |
| | | | | | | 177/119 |
| 6,013,879 | A | * | 1/2000 | Nakamura | ........... | G01G 3/1414 |
| | | | | | | 177/184 |
| 6,034,334 | A | * | 3/2000 | Nakamura | ............. | G01G 23/10 |
| | | | | | | 177/185 |

(Continued)

FOREIGN PATENT DOCUMENTS

| CN | 1884982 | 12/2006 |
| CN | 101078646 | 11/2007 |

(Continued)

OTHER PUBLICATIONS

"Search Report of Europe Counterpart Application", dated May 22, 2017, p. 1-p. 10.

(Continued)

*Primary Examiner* — Emmanuel Bayard
(74) *Attorney, Agent, or Firm* — JCIPRNET

(57) ABSTRACT

The invention is adapted to properly suppress noises of various frequency bands. An input unit (10) includes an acquiring element (11) for periodically acquiring signals from a load cell, so as to obtain time series signals; a plurality of frequency filters (121-123) for filtering the time series signals according to frequencies; and a transfer element (13) for transferring the signal filtered by at least one of the frequency filters (121-123) according to the frequency to a control device (90). The suppressed frequency bands of the frequency filters (121-123) are not repeated.

14 Claims, 5 Drawing Sheets

(56) References Cited

U.S. PATENT DOCUMENTS

| | | | | |
|---|---|---|---|---|
| 6,289,720 B1* | 9/2001 | Ohkubo | F02D 41/1498 | 73/35.01 |
| 6,402,089 B1* | 6/2002 | Kiss | B64C 27/001 | 181/207 |
| 6,539,319 B1* | 3/2003 | Grichnik | G06F 17/17 | 702/189 |
| 6,590,167 B2* | 7/2003 | Clare | G01G 17/04 | 128/DIG. 13 |
| 6,601,011 B1* | 7/2003 | Miyamoto | G01P 3/48 | 702/145 |
| 6,625,550 B1* | 9/2003 | Scott | H01H 71/125 | 361/63 |
| 6,907,128 B2* | 6/2005 | Kimura | G01G 3/147 | 381/71.1 |
| 7,183,480 B2* | 2/2007 | Nishitani | G10H 1/00 | 84/609 |
| 8,166,084 B2* | 4/2012 | Hahn | H03H 7/0153 | 708/3 |
| 2001/0026509 A1* | 10/2001 | Kimikawa | G11B 7/0901 | 369/44.32 |
| 2002/0025017 A1* | 2/2002 | Stergiopoulos | G06T 5/50 | 378/8 |
| 2003/0039428 A1* | 2/2003 | Okamoto | G01D 5/266 | 385/12 |
| 2004/0194536 A1* | 10/2004 | Honda | G01L 23/225 | 73/35.01 |
| 2006/0241392 A1* | 10/2006 | Feinstein | A61B 5/0006 | 600/422 |
| 2007/0241711 A1* | 10/2007 | Finamore | G11B 5/5582 | 318/561 |
| 2008/0265831 A1* | 10/2008 | Imai | H02P 21/06 | 318/801 |
| 2009/0122147 A1* | 5/2009 | Takashima | A61B 5/16 | 348/207.99 |
| 2009/0273488 A1* | 11/2009 | Riser | B64C 27/001 | 340/963 |
| 2010/0243086 A1* | 9/2010 | Gilpatrick | A01G 25/145 | 137/565.01 |
| 2010/0321291 A1* | 12/2010 | Kabasawa | G06F 3/0346 | 345/157 |
| 2011/0141066 A1* | 6/2011 | Shimotani | G01C 21/3664 | 345/177 |
| 2011/0285444 A1* | 11/2011 | Uemura | G01C 19/5614 | 327/299 |
| 2012/0065902 A1* | 3/2012 | Nakajima | B25J 13/085 | 702/41 |
| 2013/0025346 A1* | 1/2013 | Senkoji | G01V 1/182 | 73/1.38 |
| 2013/0223480 A1 | 8/2013 | Hays et al. | | |
| 2013/0225940 A1* | 8/2013 | Fujita | A61B 5/0245 | 600/300 |
| 2013/0245502 A1* | 9/2013 | Lange | A61B 5/1102 | 600/595 |
| 2014/0023087 A1 | 1/2014 | Czompo | | |
| 2015/0019137 A1* | 1/2015 | Hamaguri | A61B 5/1455 | 702/19 |
| 2015/0055184 A1* | 2/2015 | Lin | H04N 1/405 | 358/3.06 |
| 2015/0130652 A1* | 5/2015 | Sugino | G01S 7/415 | 342/27 |
| 2015/0182141 A1* | 7/2015 | Fujita | A61B 5/0245 | 600/500 |
| 2015/0216762 A1* | 8/2015 | Oohashi | A61M 21/02 | 601/47 |
| 2015/0234519 A1* | 8/2015 | Gowreesunker | G06F 3/044 | 345/174 |
| 2015/0247887 A1* | 9/2015 | Fukai | A61B 5/14532 | 702/19 |
| 2015/0327803 A1* | 11/2015 | Fujita | A61B 5/11 | 340/576 |
| 2016/0073953 A1* | 3/2016 | Sazonov | A61B 5/4866 | 600/590 |
| 2016/0199005 A1* | 7/2016 | Hayashi | H03L 7/093 | 600/479 |
| 2016/0244949 A1* | 8/2016 | Kanemitsu | E02F 9/264 | |
| 2016/0251836 A1* | 9/2016 | Baba | E02F 3/435 | 701/50 |
| 2016/0278648 A1* | 9/2016 | Vogel | A61B 5/02438 | |
| 2016/0286111 A1* | 9/2016 | Suwa | H04N 5/23258 | |
| 2017/0030349 A1* | 2/2017 | Bassett | F04B 51/00 | |
| 2017/0215734 A1* | 8/2017 | Yamaji | A61B 5/0022 | |
| 2017/0371470 A1* | 12/2017 | Nathan | G06F 3/0414 | |

FOREIGN PATENT DOCUMENTS

| | | |
|---|---|---|
| CN | 101554894 | 10/2009 |
| CN | 102599901 | 7/2012 |
| CN | 103038616 | 4/2013 |
| CN | 104602599 | 5/2015 |
| JP | H06167383 | 6/1994 |
| JP | H109939 | 1/1998 |
| JP | 2003207387 | 7/2003 |
| JP | 2007003524 | 1/2007 |
| JP | 2012002794 | 1/2012 |
| JP | 2012208082 | 10/2012 |
| JP | 2014-153234 | 8/2014 |
| JP | 2015040772 | 3/2015 |
| JP | 2015203668 | 11/2015 |

OTHER PUBLICATIONS

"Office Action of Japan Counterpart Application," dated Jun. 19, 2018, with English translation thereof, p. 1-p. 9.

Office Action of China Counterpart Application, with English translation thereof, dated Nov. 29, 2018, pp. 1-16.

* cited by examiner

SIGNAL PROCESSING DEVICE, CONTROL METHOD THEREOF, CONTROL PROCEDURE AND RECORDING MEDIUM

CROSS-REFERENCE TO RELATED APPLICATION

This application claims the priority benefit of Japanese application serial no. 2016-016349, filed on Jan. 29, 2016. The entirety of the above-mentioned patent application is hereby incorporated by reference herein and made a part of this specification.

BACKGROUND OF THE INVENTION

Field of the Invention

The invention relates to a signal processing device used for filtering signals coming from a sensor and transferring the same to a control device.

Description of Related Art

In recent years, a system (for example, a measuring system, a control system) adapted to measure a specified physical quantity (for example, a weight) of a measuring object based on a signal output by a sensor such as a load cell while using the measurement result is developed. Accordingly, noises adversely affecting the measurement result are required to be reduced.

In a patent literature 1, a measuring device is disclosed, which is adapted to measure a weight of a conveyed object conveyed through a belt conveyor while determining an abnormal state. In the measuring device of the patent literature 1, a filter (a frequency filter) is configured in order to eliminate the noise contained in the signal coming from the sensor.

EXISTING TECHNICAL LITERATURE

Patent Literature

Patent literature 1: Japan patent publication No. 2014-153234 (published on Aug. 25, 2014)

SUMMARY OF THE INVENTION

Problem to be Resolved by the Invention

The noises of the frequency bands contained in the signal coming from the sensor are not necessarily the same, which may have various variations according to a state change of a measured object. However, only one filter is configured in the measuring device of the patent literature 1. Therefore, in case that a plurality of frequency bands with large noise strengths exist, a problem of unable to sufficiently eliminate the noise is encountered.

In order to resolve the aforementioned problem, the invention provides a signal processing device capable of suitably suppress the noises of the frequency bands.

Technical Means for Resolving the Problem

In order to resolve the aforementioned problem, the invention provides a signal processing device to filter signals coming from a sensor and transfer the signals to a control device. The signal processing device includes a data acquiring element for periodically acquiring the signals coming from the sensor, so as to obtain the signals of a time series as time series signals; a plurality of frequency filters for filtering the time series signals acquired by the data acquiring element according to frequencies, where suppressed frequency bands of the frequency filters are not repeated; and a transfer element for transferring the signal filtered by at least one of the frequency filters according to the frequency to the control device.

According to the above structure, a proper one or more frequency filters in the frequency filters where the suppressed frequency bands are not repeated can be used to perform filtering. Therefore, the noises of the frequency bands can be properly suppressed.

Moreover, if two or more frequency filters are used, noises of various combinations of the frequency bands can be suppressed by changing a combination of the frequency filters.

Moreover, in case of a low pass filter (LPF), the so-called suppressed frequency band refers to a high frequency band suppressed by the LPF, and refers an attenuated frequency band in case of a band elimination filter (BEF).

Moreover, the signal processing device preferably includes a filter switching element for switching each of the frequency filters according to whether the plurality of frequency filters are adapted to the time series signals acquired by the data acquiring element.

According to the above structure, it is determined whether each of the frequency filters executes filtering. Therefore, only proper frequency filters execute the filtering.

For example, in case that the frequency of the noise in each sensor object (measuring object) is different, by using different frequency filters adapted to each of the sensor object, the proper frequency filters are applied.

Moreover, in the signal processing device, the filter switching element preferably switches the frequency filters according to whether the frequency filters are adapted to the time series signals acquired by the data acquiring element during the process that the data acquiring element acquires the time series signals.

According to the above structure, during the process that the data acquiring element acquires the time series signals, i.e. during an operating process of the signal processing device, the frequency filters can be switched. Therefore, even if the sensor object is changed during the operating process, the proper frequency filter adapted to the sensor object can be applied.

Moreover, in case that work measurement is performed, measuring values obtained when a work serving as the measuring object moves to a measuring position and moves away from the measuring position become noises. According to the above structure, during the process that the data acquiring element acquires the time series signals, the frequency filter is not applied to a rising part and a falling part of the signal, i.e. the signal when the work moves to the measuring position and moves away from the measuring position. Therefore, it is avoided to apply the frequency filters to unnecessary signals to cause more consumption of processing time.

Moreover, in the signal processing device, the filter switching element preferably receives a control command from the control device, and switches the frequency filters according to the control command.

According to the above structure, the control device may send the control command to implement switching of the frequency filters.

Moreover, in the signal processing device, the filter switching element preferably switches the frequency filters according to a flag configured to each of the frequency filters, where the flags are rewritten by the control device.

According to the above structure, the control device may rewrite the flags to implement switching of the frequency filters.

Moreover, in the signal processing device, the frequency filters preferably include low pass filters and notch filters.

According to the above structure, the frequency filters include the low pass filters and the notch filters. Therefore, the noise with the low frequency band can be suppressed, and the noise with a required frequency band can be suppressed.

Moreover, in order to resolve the aforementioned problem, the invention provides a control method of a signal processing device to filter signals coming from a sensor and transfer the signals to a control device. The control method of the signal processing device includes: a data acquiring step for periodically acquiring the signals coming from the sensor, so as to obtain the signals of a time series as time series signals; a filtering step for filtering the time series signals acquired in the data acquiring step according to frequencies, where at least one of a plurality of frequency filters with suppressed frequency bands thereof being not repeated is used to perform the filtering step; and a transfer step, transferring the signal obtained by performing filtering according to the frequency in the filtering step to the control device.

According to the above structure, similar to the signal processing device of the invention, the noise with the required frequency band can be properly suppressed.

Moreover, the signal processing device can be implemented through a computer. In this case, a computer can be used to serve as various elements (software elements) of the signal processing device, such that the signal processing device implemented by the computer, a control program of the signal processing device, and a recording medium recording the control program and readable by the computer also belong a protection scope of the invention.

Effect of the Invention

The signal processing device of the invention has the effect of properly suppressing the noises of the corresponding frequency bands compared to conventional techniques.

Moreover, the control method of the signal processing device of the invention also has the same effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Embodiment 1

Figure 1:
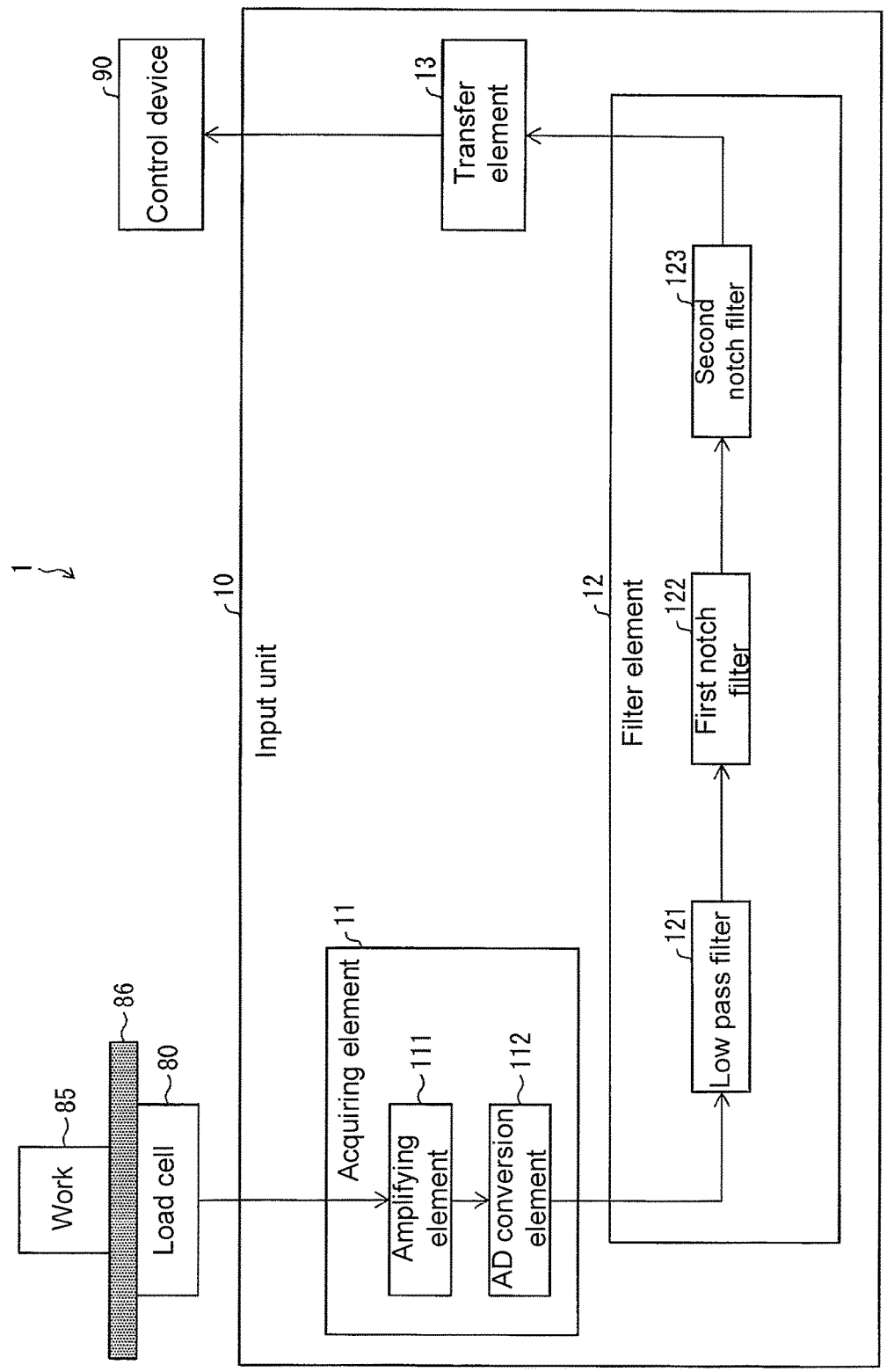
FIG. 1 is a functional block diagram of a measuring system according to an embodiment 1 of the invention.

The embodiment 1 of the invention is described below with reference of FIG. 1 and FIG. 2. FIG. 1 is a functional block diagram of a measuring system 1 according to the embodiment 1 of the invention. First, a structure of the measuring system 1 is described with reference of FIG. 1.

The Measuring System 1

The measuring system 1 has an input unit 10 (a signal processing device), a load cell 80 (a sensor) and a control device 90. Moreover, the input unit 10 has an acquiring element 11, a filter element 12 and a transfer element 13.

The load cell 80 is a sensor used for measuring a specified physical quantity of a measuring object (a sensor object). In the present embodiment, the measuring object is a work 85 placed on a weighing platform 86. In the present embodiment, the load cell 80 is used for measuring a weight of the work 85.

Figure 2:
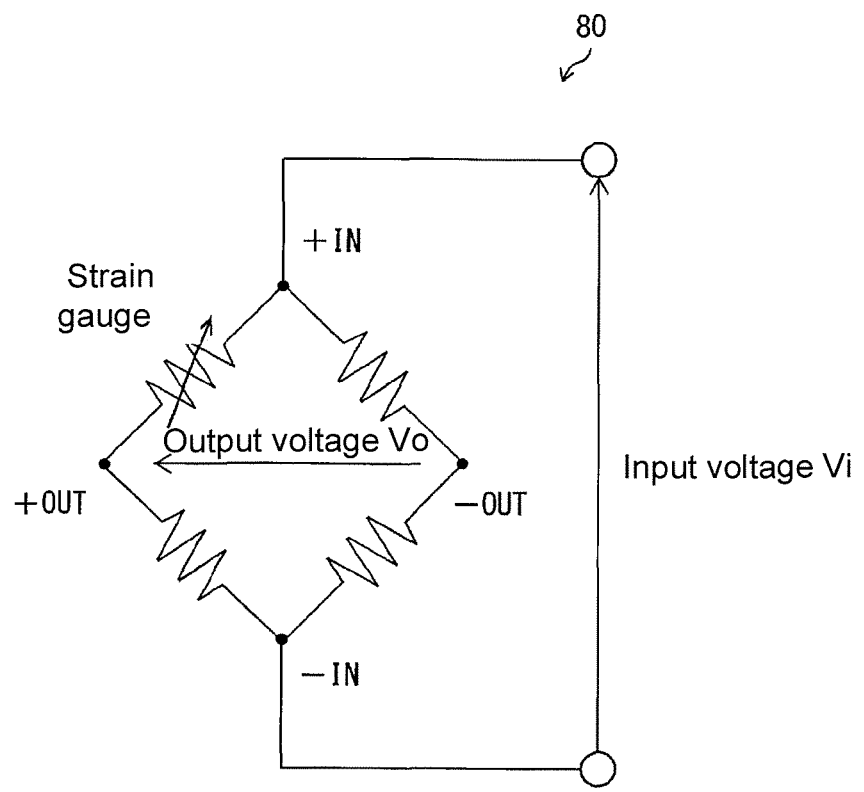
FIG. 2 is a circuit diagram schematically describing a measuring principle of a load cell.

FIG. 2 is a circuit diagram schematically illustrating a measuring principle of the load cell 80. As shown in FIG. 2, the load cell 80 has a Wheatstone bridge circuit including a strain gauge. Generally, a resistor of the strain gauge is varied along with a load (for example, a weight or a pressure, and to be specific, a stress) applied to the strain gauge.

Therefore, when the load is applied to the load cell 80, even in case that an input voltage Vi applied to the Wheatstone bridge circuit is a fixed value, an output voltage Vo is also varied. The output voltage Vo serving as a signal (electric signal, measuring signal) for measuring a weight of the work 85 is output to the input unit 10 from the load cell 80.

The input unit 10 performs various operations (amplification, AD conversion and filtering) to the measuring signal received from the load cell 80, and transfers the processed measuring signal (an aftermentioned filter signal) to the control device 90. Namely, the input unit 10 serves as an interface for transferring signals from the load cell 80 to the control device 90. Moreover, the input unit 10 can also be interpreted as a signal processing device used for processing (especially filtering) the measuring signal coming from the load cell 80 and transferring the processed measuring signal to the control device 90.

In the input unit 10, the acquiring element 11 periodically acquires the measuring signal from the load cell 80. Namely, the acquiring element 11 acquires the measuring signals of a time series. Moreover, the measuring signals of the time series are also referred to as time series signals. Moreover, the acquiring element 11 has an amplifying element 111 and an AD conversion element 112.

The amplifying element 111 amplifies the time series signal obtained from the load cell 80 and serving as an analog signal. Moreover, the AD conversion element 112 converts the time series signal amplified by the amplifying element 111 into a digital signal, and transmits the digital signal to the filter element 12. Through the AD conversion performed by the AD conversion element 112, various operations in the input unit 10 and the control device 90 are simplified.

The filter element 12 filters the digitalized time series signal provided by the AD conversion element 112 according to a frequency thereof. To be specific, the filter element 12 serves as a digital filter filtering signals of a specific frequency band.

The filter element 12 has three digital filters of a low pass filter (LPF) 121 (frequency filter), a first notch filter 122 (notch filter, frequency filter) and a second notch filter 13 (notch filter, frequency filter).

The LPF 121 is a filter filtering signals of a high frequency band. Namely, the LPF 121 is a filter allowing signals of a low frequency band to pass there through. Moreover, the LPF is also referred to as a low frequency band pass filter.

Moreover, the first notch filter 122 and the second notch filter 123 are filters only filtering signals of specific frequency bands. The first notch filter 122 and the second notch filter 123 can be respectively interpreted as a band elimination filter (BEF) suppressing a narrow frequency band.

Moreover, the LPF 121, the first notch filter 122 and the second notch filter 123 are set to suppress frequency bands that are not repeated. For example, in the present embodiment, the first notch filter 122 is set to filter middle frequency band signals, and the second notch filter 123 is set to filter high frequency band signals.

In the present embodiment, the digitalized measuring signal is filtered by the LPF 121, the first notch filter 122 and the second notch filter 123. The filtered time series signal is referred to as a filter signal hereinafter.

Moreover, as shown in the following embodiment 2, not all of the LPF 121, the first notch filter 122 and the second notch filter 123 can be used to implement filtering of the digitalized time series signal.

The transfer element 13 receives the filter signal from the filter element 12, and transfers the filter signal to the control device 90. Then, the control device 90 operates the filter signal for transforming the same into a specified physical quantity. For example, the control device 90 transforms the filter signal into a weight. The transforming result is also referred to as a measuring result (measuring value).

Moreover, the transformation can be carried out in the transfer element 13. In this case, the transfer element 13 transfers the transforming result to the control device 90.

As described above, the measuring system is a system using the load cell 80 to measure a weight of the work 85. Moreover, the control device 90 may use the measured weight of the work 85 to control various external devices.

Effect of the Measuring System 1

In the measuring system 1, a mechanical noise or an electrical noise may cause an adverse effect to the measuring value. The mechanical noise is due to (i) vibration of a mechanical system, or (ii) noises caused by an inherent vibration frequency of an inertial system containing the work 85 and the weighing platform 86. Moreover, the electrical noise is, for example, (i) a low frequency noise with a frequency of 50 Hz or 60 Hz, or (ii) a high frequency noise with a frequency of 1 kHz-10 kHz. Therefore, in the measuring system 1, the filter element 12 is configured to eliminate the influence on the measuring value caused by the noises.

In an example, it is assumed that a frequency of the electrical low frequency noise is 60 Hz, a vibration frequency of the mechanical system is 200 Hz, and a frequency of the electrical high frequency noise is 1 kHz-10 kHz.

In this case, the LPF 121 can be adopted to eliminate the electrical high frequency noises of frequencies 1 kHz-10 kHz (the noises of the high frequency band). Moreover, the first notch filter 122 can be adopted to eliminate the electrical low frequency noise with the frequency 60 Hz (the noise with a specified frequency (a first specified frequency) of the low frequency band). Moreover, the second notch filter 123 can be adopted to eliminate the mechanical noise with the frequency 200 Hz (the noise with a specified frequency (a second specified frequency) of the low frequency band).

In case that the electrical noise and the mechanical noise are overlapped, a plurality of noise frequency bands exist. However, as described above, in the conventional technique, only one frequency filter is configured, so that the frequency band where the noise can be properly suppressed is limited to one. Therefore, the noises cannot be sufficiently suppressed sometimes.

On the other hand, according to the measuring system 1 of the present embodiment, even a plurality of noise frequency bands exist (for example, in case that the electrical noise and the mechanical noise are overlapped), a plurality of frequency filters (the LPF 121, the first notch filter 122 and the second notch filter 123) corresponding to the frequency bands can be adopted to properly suppress the noises.

Embodiment 2

The embodiment 2 of the invention is described below with reference of FIG. 3-FIG. 6. Moreover, to facilitate description, like reference numerals in the drawings denote like elements, and thus their description will be omitted.

Measuring System 2

Figure 3:
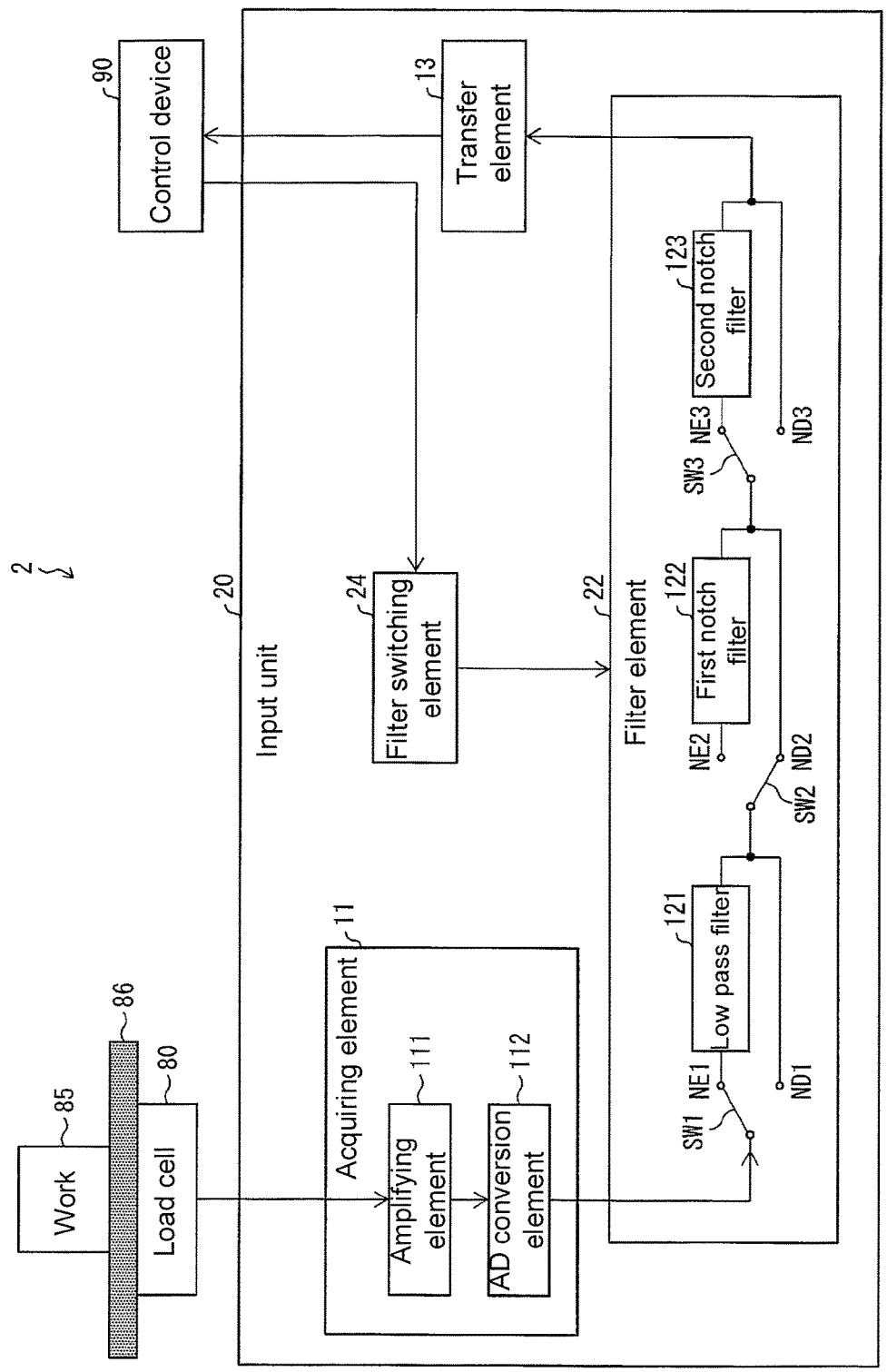
FIG. 3 is a functional block diagram of a measuring system according to an embodiment 2 of the invention.

FIG. 3 is a functional block diagram of a measuring system 2 according to the embodiment 2 of the invention. The measuring system 2 of the present embodiment is similar to the measuring system 1 of the embodiment 1, though in the measuring system 2, an input unit 20 (signal processing device) is adopted to replace the input unit 10.

Moreover, the structure of the input unit 20 of the present embodiment is similar to the input unit 10 of the embodiment 1, though in the input unit 20, (i) a filter element 22 is adopted to replace the filter element 12, and (ii) a filter switching element 24 is added.

Moreover, the filter element 12 of the embodiment 1 is added by switches SW1-SW3 to construct the structure of the filter element 22 of the present embodiment. As shown in FIG. 3, the switches SW1-SW3 are respectively used for switching valid/invalid filtering of each of the frequency filters (the LPF 121, the first notch filter 122, the second notch filter 123).

The switch SW1 is used for switching a connection state between an output terminal of the AD conversion element 112 and an input terminal of the LPF 121. A situation of connecting the switch SW1 to a node NE1 (a node at the input terminal of the LPF 121) is referred to as a turn-on state, and a situation of connecting the switch SW1 to a node ND1 (a node different to the input terminal of the LPF 121) is referred to as a turn-off state.

In case that the switch SW1 is in the turn-on state, the signal (the time series signal) output by the output terminal of the AD conversion element 112 is input to the LPF 121, and the LPF 121 accordingly executes a filtering operation. On the other hand, in case that the switch SW1 is in the turn-off state, the signal output by the output terminal of the AD conversion element 112 is not input to the LPF 121, so that the LPF 121 does not execute the filtering operation. In this way, the switch SW1 is used for switching valid/invalid filtering of the LPF 121.

The switch SW2 is used for switching a connection state between an output terminal of the LPF 121 and an input terminal of the first notch filter 122. A situation of connecting the switch SW2 to a node NE2 (a node at the input terminal of the first notch filter 122) is referred to as the turn-on state, and a situation of connecting the switch SW2 to a node ND2 (a node different to the input terminal of the first notch filter 122) is referred to as the turn-off state.

In case that the switch SW2 is in the turn-on state, the signal output by the output terminal of the LPF 121 is input to the first notch filter 122, and the first notch filter 122 accordingly executes a filtering operation. On the other hand, in case that the switch SW2 is in the turn-off state, the signal output by the output terminal of the LPF 121 is not input to the first notch filter 122, so that the first notch filter 122 does not execute the filtering operation. In this way, the switch SW2 is used for switching valid/invalid filtering of the first notch filter 122.

The switch SW3 is used for switching a connection state between an output terminal of the first notch filter 122 and an input terminal of the second notch filter 123. A situation of connecting the switch SW3 to a node NE3 (a node at the input terminal of the second notch filter 123) is referred to as the turn-on state, and a situation of connecting the switch SW3 to a node ND3 (a node different to the input terminal of the second notch filter 123) is referred to as the turn-off state.

In case that the switch SW3 is in the turn-on state, the signal output by the output terminal of the first notch filter 122 is input to the second notch filter 123, and the second notch filter 123 accordingly executes a filtering operation. On the other hand, in case that the switch SW3 is in the turn-off state, the signal output by the output terminal of the first notch filter 122 is not input to the second notch filter 123, so that the second notch filter 123 does not execute the filtering operation. In this way, the switch SW3 is used for switching valid/invalid filtering of the second notch filter 123.

Moreover, the filter switching element 24 is a member for controlling switching of the respective turn on/off state of the switches SW1-SW3. In other words, the filter switching element 24 is used for controlling switching of valid/invalid filtering of each of the frequency filters.

In an example, the filter switching element 24 may receive a control command from the control device 90, and control switching of the respective turn on/off state of the switches SW1-SW3 according to the control command. According to the above structure, by sending the control command to the filter switching element 24 from the control device 90, switching of the valid/invalid filtering of each of each of the frequency filters is implemented.

Moreover, preferably, during a process that the acquiring element 11 acquires the time series signal, the filter switching element 24 controls switching of the respective turn on/off state of the switches SW1-SW3 (i.e. switching of the valid/invalid filtering of each of the frequency filters).

According to the above structure, switching of valid/invalid filtering of each of the frequency filters can be implemented during the process that the acquiring element 11 acquires the time series signal, i.e. during the process that the input unit 20 operates. Therefore, as described later, even if a sensor object (the work) is changed during the measuring process, the proper frequency filter adapted to the sensor object can be applied.

Moreover, the filter switching element 24 may control switching of the respective turn on/off state of the switches SW1-SW3 (in other words, switching of the valid/invalid filtering of each of the frequency filters) according to a flag set corresponding to each of the frequency filters (for example, the aftermentioned switching signals SIG1-SIG3). Moreover, preferably, the flags are rewritten by the control device 90.

According to the above structure, by using the control device 90 to rewrite the flags, switching of the valid/invalid filtering of each of the frequency filters can be implemented. Moreover, rewriting of the flags can be implemented by a user by operating the control device 90, and can also be implemented through a program prepared by the user.

First Effect of the Measuring System 2

According to the measuring system 2 of the present embodiment, a measuring time is decreased. The effect is described below with reference of FIG. 4 and FIG. 5. The switching signals set corresponding to the LPF 121, the first notch filter 122 and the second notch filter 123 are referred to as switching signals SIG1-SIG3 (flags).

The switching signals SIG1-SIG3 are control signals used for setting each of the frequency filters to be invalid. In the present embodiment, the switching signals SIG1-SIG3 are digital signals of one bit. The switching signals SIG1-SIG3 can also be referred to as invalid bits.

To be specific, in case that a value (a logic value) of each of the switching signals SIG1-SIG3 is "1" (logic high), the LPF 121, the first notch filter 122 and the second notch filter 123 are respectively invalid. On the other hand, in case that the value of each of the switching signals SIG1-SIG3 is "0" (logic low), the LPF 121, the first notch filter 122 and the second notch filter 123 are respectively valid.

Figure 5:
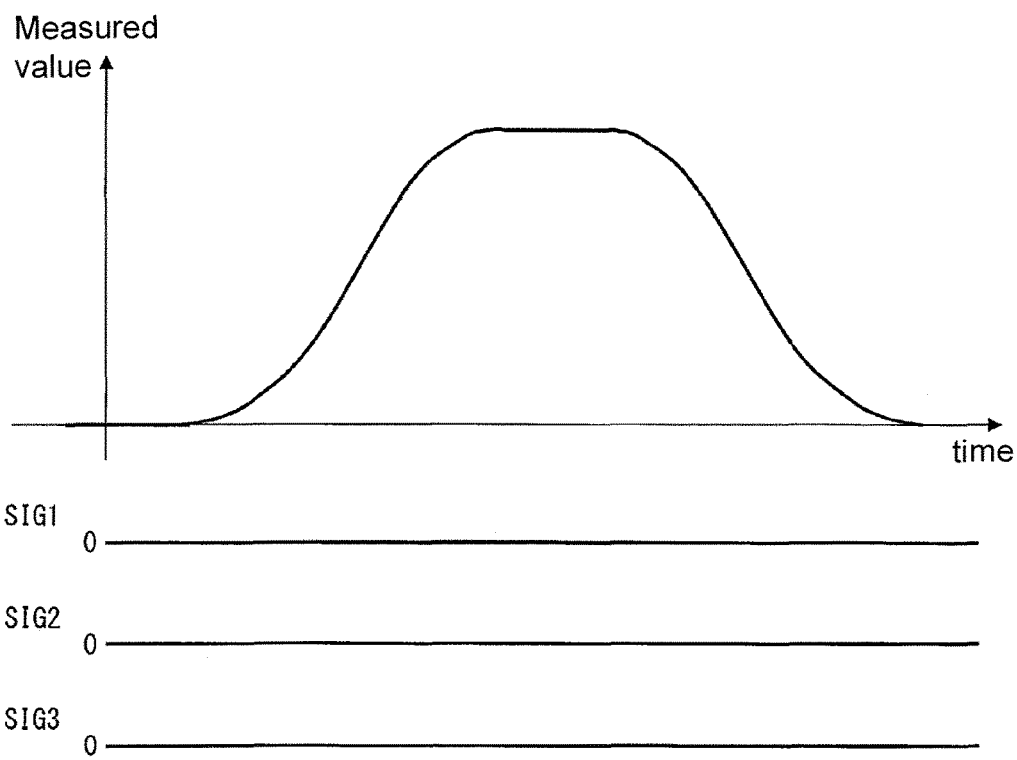
FIG. 5 is a diagram compared with FIG. 4, and is an example of a relationship between operation of each frequency filter and a measuring time.

FIG. 5 is an example of a relationship between operations of each of the frequency filters and a measuring time. Moreover, FIG. 5 is a comparison diagram of the aftermentioned diagram 4. To be specific, in FIG. 5, the values of the switching signals SIG1-SIG3 are kept to be 0, and the frequency filters are kept to be valid.

As shown in FIG. 5, in case that all of the frequency filters are valid, although the measuring value of a full time range is sufficiently stable, since a response time of each of the frequency filters is prolonged, the measuring time is prolonged sometimes.

Therefore, in the present embodiment, by adding the switching function of the valid/invalid filtering of the frequency filters to the measuring system, even if a plurality of frequency filters are used, the measuring time can still be reduced.

Figure 4:
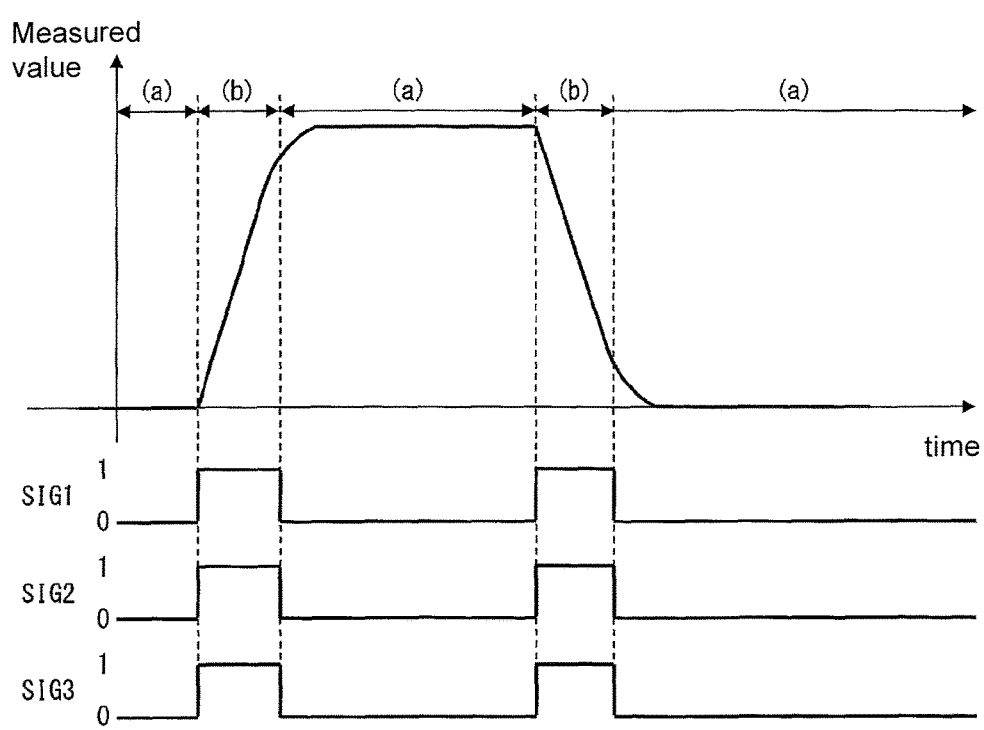
FIG. 4 is an example of a relationship between operation of each frequency filter of the measuring system and a measuring time according to the embodiment 2 of the invention.

FIG. 4 is an example of a relationship between operation of each frequency filter of the measuring system 2 and a measuring time. In FIG. 4, a period (a) is a period in which the values of the switching signals SIG1-SIG3 are "0", and all of the frequency filters are valid. In an example, the period (a) is a period during which a stable measuring value is particularly expected. In the case of FIG. 4, the period (a) is a period during which the measuring value is substantially fixed.

On the other hand, a period (b) is a period during which the values of the switching signals SIG1-SIG3 are changed to "1", and all of the frequency filters are invalid. The period (b) is a period other than the period (a). In other words, the period (b) is a period during which the measuring value is not stabilized. In the case of FIG. 4, the period (4) is a rising period and a falling period of the measuring value. Moreover, in an example, rising of the measuring value is occurred when the work 85 is placed on the weighing platform 86. Moreover, falling of the measuring value is occurred when the work 85 is unloaded from the weighing platform 86.

During the period (b), operations of each of the frequency filters are set to be invalid, and compared to the situation that the operations of each of the frequency filters are set to be valid, the measuring time can be reduced. In an example, referring to FIG. 4, it is known that the rising period and the falling period of the measuring value is substantially shorter compared to that of FIG. 5.

In this way, according to the measuring system 2, each of the frequency filter can be set to be valid only during the period that the stable measuring value is particularly expected, so that even in case that a plurality of frequency filters are configured, the measuring time can still be reduced.

Second Effect of the Measuring System 2

Moreover, according to the measuring system 2 of the present embodiment, the proper frequency filter can be switched according to a change of the measuring object, and an effect thereof is described below with reference of FIG. 6.

Figure 6:
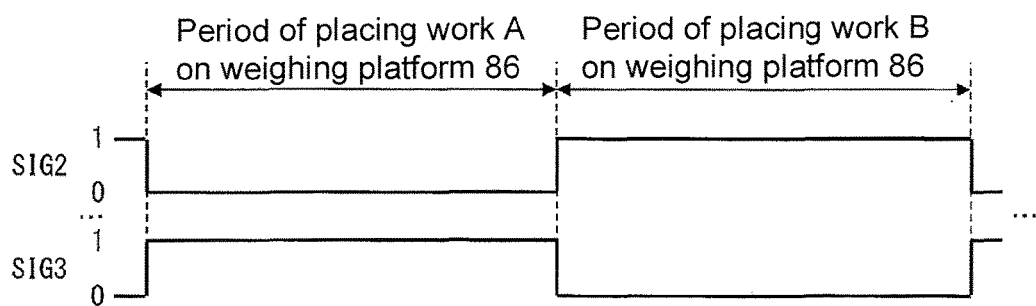
FIG. 6 is a diagram illustrating switching signals of a measuring system according to the embodiment 2 of the invention.

FIG. 6 is a diagram illustrating the switching signals of the measuring system 2. Moreover, in FIG. 6, in order to describe the operations of the first notch filter 122 and the second notch filter 123, the switching signal SIG1 is omitted.

In the measuring system 2, the type of the work serving as the measuring object is not limited to one, and sometimes a plurality of types of works respectively serve as measuring objects. In an example, it is assumed that two types of works with different weights serve as the measuring objects. In order to distinguish the two types of works, the two types of works are respectively referred to as a work A and a work B.

Now, since the weights of the work A and the work B are different, an inertial system (an inertial system A) including the work A and the weighing platform 86 and an inertial system (an inertial system B) including the work B and the weighing platform 86 have different inherent vibration frequencies. Therefore, the situation of placing the work A on the weighing platform 86 and the situation of placing the work B on the weighing platform 86 may produce noises with frequencies of different frequency bands.

Therefore, in the structure of FIG. 6, characteristics of each of the frequency filters are preset as: (i) the first notch filter 122 reduces the noise with the frequency around the inherent vibration frequency of the inertial system A, and (ii) the second notch filter 123 reduces the noise with the frequency around the inherent vibration frequency of the inertial system B.

As shown in FIG. 6, during the period of placing the work A on the weighing platform 86, if it is set as SIG2=0, SIG3=1, only the first notch filter 122 can be set to be valid during such period. On the other hand, during the period of placing the work B on the weighing platform 86, if it is set as SIG2=1, SIG3=0, only the second notch filter 123 can be set to be valid during such period.

In this way, according to the measuring system 2, the proper frequency filter can be switched according to a change of the work placed on the weighing platform 86. Therefore, even in case that a plurality of works serve as the measuring objects, the measuring value can still be stabilized. Besides, the frequency filters that are ineffective for reducing the noises can be set to be invalid, such that increase of the measuring time can also be suppressed.

Moreover, the structure of FIG. 6 is also applicable in case that the type of the work is one. In an example, in case that the weight of the work 85 and the weight of the weighing platform 86 are in the same level, an inherent vibration frequency of the weighing platform 86 is different to the inherent vibration frequency of the inertial system including the work 85 and the weighing platform 86. Now, noises with different frequencies are produced around the time when the work 85 is placed on the weighing platform 86 and around the time when the work 85 is unloaded from the weighing platform 86.

In order to deal with such change of the noise frequency, the characteristics of each of the frequency filters can be preset as: (i) the first notch filter 122 reduces the noise with the frequency around the inherent vibration frequency of the weighing platform 86, and (ii) the second notch filter 123 reduces the noise with the frequency around the inherent vibration frequency of the inertial system including the work 85 and the weighing platform 86. According to such structure, when the work 85 is placed on the weighing platform 86 and unloaded from the weighing platform 86, the proper frequency filter can be respectively switched.

Variations (1) Moreover, in a measuring system of one pattern of the invention, the number of the frequency filters set in the filter element is not limited to three. For example, the number of the frequency filters can be four or more, i.e. the spirit of the invention is met as long as the filter element has a plurality of (two or more than two) frequency filters where the suppressed frequency bands thereof are not repeated.

According to the above structure, the proper one or more frequency filters in the frequency filters where the suppressed frequency bands thereof are not repeated can be used to execute the filtering operations corresponding to the frequencies, so as to properly suppress the noises of the frequency bands. Moreover, if a plurality of frequency filters are adopted, the noises of various combinations of the frequency bands can be suppressed by changing a combination of the frequency filters.

(2) Moreover, in a measuring system of one pattern of the invention, the sensor is not limited to the load cell. For example, the sensor in the measuring system of one pattern of the invention can also be a temperature sensor, a light sensor or a rotation speed sensor, etc.

Implementation Through Software

Control modules (especially the input unit 10, the input unit 20 and the control device 90) of the measuring system 1 and the measuring system 2 can be implemented by logic circuits (hardware) formed on an integrated circuit (IC (chip)), and can also be implemented by using a central processing unit (CPU) through software.

In the later case, the measuring system 1 and the measuring system 2 have a CPU adapted to execute commands of software (i.e. programs) capable of implementing various functions, a read only memory (ROM) or a storage device (referred to as a recording medium) recording the programs and various data that can be read by a computer (or the CPU), a random access memory (RAM) for spreading the programs, etc. Moreover, the programs recorded in the recording medium can be read and executed by the computer (or the CPU) to achieve the purpose of the invention. The recording medium can be implemented by a non-transitory physical medium, for example, a tape, a disk, a card, a semiconductor memory, a programmable logic circuit, etc. Moreover, the program can be provided to the computer through any transmission medium (a communication network or a radio wave, etc.) capable of transmitting the program. In addition, the data embodying the program and embedded in carriers can be implemented in form of signals through teletransmission.

Notes

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A signal processing device, adapted to filter signals coming from a load cell measuring a weight of at least one work and transfer the signals to a control device, the signal processing device comprising:
    a data acquiring circuit, periodically acquiring the signals from the load cell, so as to obtain the signals of a time series as time series signals;
    a plurality of frequency filters, filtering the time series signals acquired by the data acquiring circuit according to frequencies, wherein frequency bands suppressed by the frequency filters are not repeated, and each of the plurality of frequency filters is preset with an inherent vibration frequency of an inertial system including the at least one work being measured and a weighing platform where the at least one work is placed, wherein the plurality of frequency filters are switched by detecting a change of the at least one work being measured; and
    a transfer circuit, transferring the signal filtered by at least one of the frequency filters according to the frequency to the control device.

2. The signal processing device as claimed in claim 1, further comprising:
    a filter switching circuit, switching each of the frequency filters according to whether the plurality of frequency filters are adapted to the time series signals acquired by the data acquiring circuit.

3. The signal processing device as claimed in claim 2, wherein the filter switching circuit switches the frequency filters according to whether the frequency filters are adapted to the time series signals acquired by the data acquiring circuit during the process that the data acquiring circuit acquires the signals of the time series.

4. The signal processing device as claimed in claim 3, wherein the filter switching circuit receives a control command from the control device, and switches the frequency filters according to the control command.

5. The signal processing device as claimed in claim 3, wherein the filter switching circuit switches the frequency filters according to a flag configured to each of the frequency filters,
    wherein the flags are rewritten by the control device.

6. The signal processing device as claimed in claim 1, wherein the frequency filters comprise low pass filters and notch filters.

7. A non-transitory recording medium, recording control procedure, adapted to be accessed by and loaded to a computer serving as the signal processing device as claimed in claim 1, wherein the control procedure is loaded to the computer to implement functions of the data acquiring circuit, the frequency filters and the transfer circuit.

8. A control method of a signal processing device, adapted to filter signals coming from a load cell measuring a weight of at least one work and transfer the signals to a control device, the control method of the signal processing device comprising:
    a data acquiring step, periodically acquiring the signals from the load cell, so as to obtain the signals of a time series as time series signals;
    a filtering step, filtering the time series signals acquired in the data acquiring step according to frequencies, wherein at least one of a plurality of frequency filters with suppressed frequency bands being not repeated is used to perform the filtering step, each of the plurality of frequency filters is preset with an inherent vibration frequency of an inertial system including the at least one work being measured and a weighing platform where the at least one work is placed, and the plurality of frequency filters are switched by detecting a change of the setup of the at least one work being measured; and
    a transfer step, transferring the signal obtained by performing filtering according to the frequency in the filtering step to the control device.

9. A signal processing device, adapted to filter signals coming from a load cell measuring a weight of at least one work and transfer the signals to a control device, the signal processing device comprising:
    a processor, configured to periodically acquire the signals from the load cell, so as to obtain the signals of a time series as time series signals; and
    a plurality of frequency filters, filtering the time series signals acquired by the processor according to frequencies, wherein frequency bands suppressed by the frequency filters are not repeated, and each of the plurality of frequency filters is preset with an inherent vibration frequency of an inertial system including the at least one work being measured and a weighing platform where the at least one work is placed, and the plurality of frequency filters are switched by detecting a change of the at least one work being measured,
    wherein the processor is further configured to transfer the signal filtered by at least one of the frequency filters according to the frequency to the control device.

10. The signal processing device as claimed in claim 9, wherein the processor is further configured to switch each of the frequency filters according to whether the plurality of frequency filters is adapted to the time series signals.

11. The signal processing device as claimed in claim 10, wherein the processor switches the frequency filters according to whether the frequency filters are adapted to the time series signals during the process that the processor acquires the signals of the time series.

12. The signal processing device as claimed in claim 11, wherein the processor receives a control command from the control device, and switches the frequency filters according to the control command.

13. The signal processing device as claimed in claim 11, wherein the processor switches the frequency filters according to a flag configured to each of the frequency filters, wherein the flags are rewritten by the control device.

14. A non-transitory recording medium, recording control procedure, adapted to be accessed by and loaded to a computer serving as the signal processing device as claimed in claim 9, wherein the control procedure is loaded to the computer to implement functions of the processor and the frequency filters.

\* \* \* \* \*